Sept. 26, 1961 W. K. MUELLER 3,002,129
COUNTERBALANCED SHUTTER BLADE ARRANGEMENT
FOR ENCLOSED SWITCHBOARD STRUCTURES
Filed Nov. 28, 1958 2 Sheets-Sheet 1

Inventor
Walter K. Mueller
by Warren F. B. Fridley
Attorney

Sept. 26, 1961 W. K. MUELLER 3,002,129
COUNTERBALANCED SHUTTER BLADE ARRANGEMENT
FOR ENCLOSED SWITCHBOARD STRUCTURES
Filed Nov. 28, 1958 2 Sheets-Sheet 2

Inventor
Walter K. Mueller
by Warren F. B. Lindsley
Attorney

United States Patent Office 3,002,129
Patented Sept. 26, 1961

3,002,129
COUNTERBALANCED SHUTTER BLADE ARRANGEMENT FOR ENCLOSED SWITCHBOARD STRUCTURES
Walter K. Mueller, West Allis, Wis., assignor to Allis-Chalmers Manufacturing Company, Milwaukee, Wis.
Filed Nov. 28, 1958, Ser. No. 776,895
5 Claims. (Cl. 317—103)

This invention relates to enclosed switchboard structures and more particularly to shutters for controlling communication between juxtapositioned compartments thereof.

Switchboard structures usually employ fixed circuit conductors such as bus bars, electric switches and accessory apparatus. The switches and some associated equipment are often mounted on carriers such as trucks which may each carry a panel section of the switchboard structure. The panel sections cooperate to form a closure for each of the switchboard structures when the carriers are in their service positions. Connections between the carrier supported switch and the fixed circuit conductors are established through disconnecting switches having their movable contact members carried by the carriers and their stationary contact members fixedly disposed within the rear compartments of the structures. In this type of structure the circuit terminals and apparatus associated therewith are isolated when the carrier is removed from its compartment within the structure and the switch and associated equipment carried thereby are electrically disconnected from the circuit.

In order to protect an operator against contact with the fixed members of a disconnecting switch or live conductors associated therewith when he enters the carrier compartment, a shutter is disposed within the switchboard enclosure between the fixed contact of the disconnecting switch and its associated live conductors and the operator.

Heretofore shutters have been operated automatically by the movement of the carrier into and out of its compartment and so arranged that when the carrier is moved out of its compartment the shutter is caused to drop by its weight into a covering or shielding position in front of the stationary members of the disconnecting switch and to be raised to uncover these stationary members when the carrier is moved into its compartment. This type of shutter requires a considerable amount of effort or work by the operator to not only move the carrier into its compartment but also to overcome gravity to actuate the shutter to its raised or open position. It sometimes happens that this type of shutter is accidentally held in raised position by friction after the carrier has been removed and thereby fails to provide the protection desired.

In accordance with the invention claimed a new and improved enclosed switchboard structure is provided having two communicating compartments. A shutter mechanism for controlling communication between the compartments is arranged for movement between open and closed positions. This mechanism comprises a pair of spaced vertically arranged rods mounted to reciprocate axially and having a pair of shutter blades arranged to extend between the rods with each of the blades being fixedly attached to a different one of the rods. A pivotally mounted lever is loosely connected at each end thereof to a different one of the rods for actuating the blades in a counterbalancing arrangement and means comprising a carrier is mounted for movement into and out of the enclosed switchboard structure for actuating the pivotally mounted lever.

It is, therefore, one object of this invention to provide a new and improved enclosed switchboard structure.

Another object of this invention is to provide a new and improved enclosed switchboard structure employing a counterbalanced shutter arrangement.

A further object of this invention is to provide a new and improved enclosed switchboard structure employing a removable switch contact carrier which controls the movement of a shutter to shutter open and closed positions during movement of the carrier into and out of a compartment within the enclosure.

A still further object of this invention is to provide a new and improved enclosed switchboard structure in which a counterbalanced shutter is positively actuated both in its opening and closing movements.

Objects and advantages other than those above set forth will be apparent from the following description when read in connection with the accompanying drawings, in which.

Figure 1:
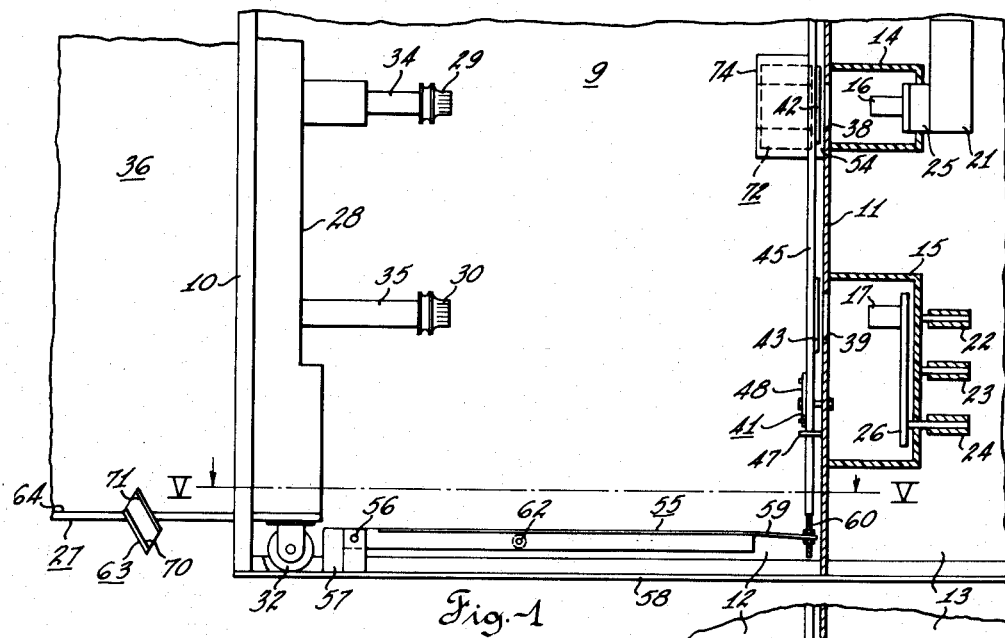
FIG. 1 is a side sectional elevational view of an enclosed switchboard structure and a removable truck with its associated mechanism in partially withdrawn position and embodying the invention.

Referring to the drawings by characters of reference, FIG. 1 illustrates an enclosed switchboard structure comprising a housing 9 formed of a front upright surface 10 and a rearwardly spaced upright surface 11 with suitable plates attached to surfaces 10 and 11 to enclose the space of a first compartment 12 therein and rearward of surface 11 to enclose the space of a second compartment 13. Upright surface 11 supports a pair of housing elements 14 and 15. A plurality of pairs of stationary contact members 16 and 17 are enclosed by housing elements 14 and 15 and comprise the fixed contact members of a disconnecting switch 18. Contact members 16 and 17 are electrically connected to two of a plurality of bus bars 21, 22, 23 and 24 through suitable connectors 25 and 26. Although in general enclosed switchboards are provided with a plurality of similar pole structures one for each phase of a polyphase electric circuit (note FIGS. 3 and 4), only one such pole structure is illustrated in the side elevational views shown in FIGS. 1 and 2.

A movable carrier such as a truck 27 is arranged for movement into and out of the enclosed switchboard structure 9. This truck comprises a framework 28 adopted to support movable contacts 29 and 30 of disconnecting switch 18. Truck 27 is mounted on supporting wheels 32 by which it may be moved into and withdrawn from its enclosing compartment 12. A vertical panel 33 is carried by the truck on the forward face thereof and when the truck is in service position within the switchboard enclosure it forms substantially the closure for the truck compartment. An electric switch such as an air magnetic circuit breaker symbolically shown by a reference character 36 may be carried by the truck frame in the rear of panel 33.

Figure 2:
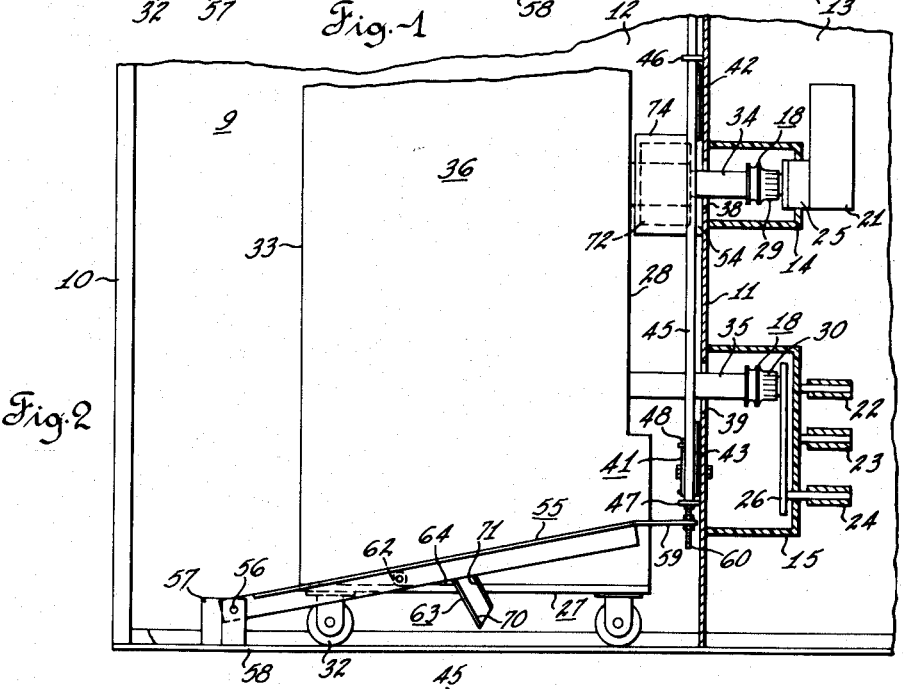
FIG. 2 is a side sectional elevational view similar to FIG. 1 with the truck in fully racked in position.

A plurality of insulated conductors 34 and 35, here shown as vertically aligned, are carried by the truck frame 28 and are disposed in approximate horizontal alignment with the stationary contact members 16 and 17 of the disconnecting switch 18. These conductors are provided with contact members 29 and 30 at their ends which members are suitably connected electrically with the terminals of the air magnetic circuit breaker 36. When truck 27 is in service position within its compartment 12 in the enclosed switchboard structure, as shown in FIG. 2, the movable contact members 29 and 30 are adopted to engage the fixed contact members 16 and 17 of the disconnecting switch 18. When truck 27 is withdrawn from the enclosed switchboard structure contact members 16, 29 and 17, 30 are separated thereby disconnecting the air magnetic circuit breaker or other switching device usually mounted on frame 28 of truck 27 from the electric circuit.

Figures 3, 4:
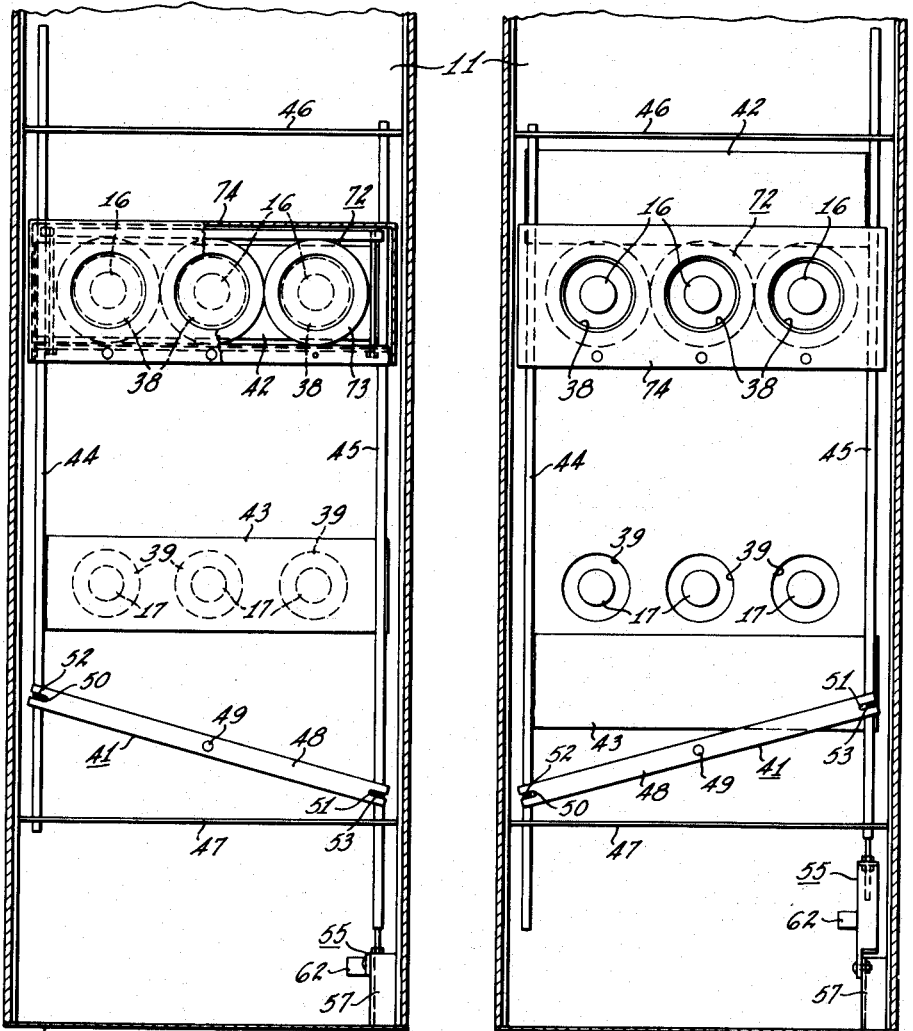
FIG. 3 is a left end elevational view partly in section of the enclosed switchboard structure shown in FIGS. 1 and 2 with the truck removed and the shutter shown in closed position.
FIG. 4 is a left end elevational view partly in section of the enclosed switchboard structure shown in FIGS. 1 and 2 with the truck removed and the shutter shown in open position.
Figure 5:
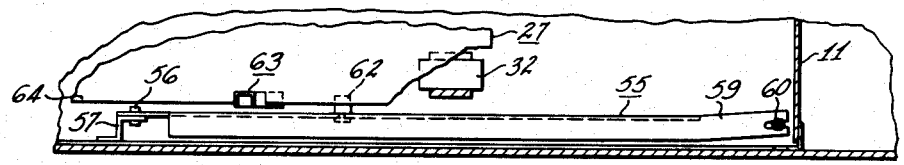
FIG. 5 is a cross sectional view of the structure shown in FIG. 1 taken along the line V—V with the truck moved further toward switch engaging position.

The stationary contact members 16 and 17 of the disconnecting switch 18 and also the circuit conductors 25 and 26 arranged within compartment 13 are separated from the truck compartment 12 by the upright surface 11 which is disposed in spaced relationship in front of stationary contact members 16 and 17. Upright surface 11, as shown in FIGS. 3 and 4, is provided with pairs of apertures 38 and 39 through which conductors 34 and 35 and the supported contact members 29 and 30 carried by truck 27 may be extended to make contact with the stationary contact members 16 and 17.

In accordance with the invention claimed a shutter 41 is provided to move into shutter closed position to cover apertures 38 and 39 before truck 27 is completely withdrawn from compartment 12 and to move into shutter open position to uncover apertures 38 and 39 before truck 27 is moved completely into its service position within its compartment 12. Shutter 41 comprises a pair of vertically spaced reciprocally mounted plates or blades 42 and 43, which are connected in a counterbalancing arrangement for minimizing the force required for actuation thereof. One of the blades moves upward against the effect of gravity while the other blade simultaneously moves downwardly under the effects of gravity. When the shutter is actuated to shutter open position blade 42 is moved above apertures 38 and blade 43 is moved below apertures 39 as shown in FIG. 4. When the shutter is actuated to shutter closed position blades 42 and 43 are moved over apertures 38 and 39, respectively, as shown in FIG. 3, to prohibit entrance thereto.

One end of each of the lateral edges of blades 42 and 43 are fixedly attached to a different one of a pair of vertically extending rods 44 and 45 mounted to slide axially. Rods 44 and 45 are slidably mounted in cross members 46 and 47 which members form a part of the frame of the switchboard housing 9 and are supported by rod 48 pivotally mounted at 49 to housing 9. Rod 48 is provided at each end along the longitudinal axis thereof with slots 50 and 51 which provide a loose connection with pins 52 and 53 on rods 44 and 45, respectively, so that rod 48 may be rotated causing the reciprocating movement of rods 44 and 45. As rod 48 is rotated clockwise, rod 44 moves upward to move blade 43 over apertures 39 and rod 45 moves downward causing blade 42 to cover apertures 38. The left end of blade 42 and the right end of blade 43 are loosely arranged in a slot or track 54 formed between rods 44 and 45 and upright surface 11.

The shutter operating mechanism comprises a lever 55 pivotally mounted at 56 to a bracket 57 secured to base 58 on one side of the truck compartment. The rear end 59 of lever 55 is loosely connected to a pin 60 extending from the lower end of rod 45. Reciprocating movement of lever 55 causes rod 45 to reciprocate axially. Such movement of rod 45 causes pivotal movement of rod 48 and pivotal movement of rod 48 causes rod 44 to reciprocate axially. Lever 55 is actuated by movement of truck 27 into and out of the truck compartment and is provided with a roller 62 journaled on a shaft mounted on the outer side thereof. Roller 62 engages with a guiding track, slot or cam follower element 63 mounted on truck 27. Cam follower element 63 forms a dual acting track which forms a lower cam surface 70 for the cam follower to ride on during a shutter opening operation and an upper cam surface 71 for the cam follower to ride on during a shutter closing operation. As roller 62 engages cam follower element 63 it moves along the slot therein until the roller reaches a horizontal surface or cam plate 64 on truck 27. Cam plate 64 extends laterally from the body of truck 27 and is disposed to provide a bearing surface for roller 62 during a predetermined movement of truck 27. During the movement of roller 62 through the slot of cam follower element 63, lever 55 is rotated counterclockwise, as shown in FIG. 4, raising rod 45 thereby causing shutter 41 to move to shutter open position. When truck 27 is removed from the truck compartment roller 62 is caused to roll along surface 64 until it reaches the slot of cam follower element 63. Upon reaching cam follower element 63 roller 62 moves through this slot to a lower level thereby rotating lever 55 clockwise, as shown in FIG. 3, to shutter closed position.

FIGS. 1–4 illustrate a plurality of current transformers 72 mounted in the truck compartment against the upright surface 11. These transformers each comprise an apertured coil 73 arranged around and juxtaposed to a different one of apertures 38. Although current transformers 72 are shown only around apertures 38 they may be positioned also around apertures 39. Blade 42 of shutter 41 is arranged to move between coils 73 and apertures 38 within the truck compartment. Coils 73 are so aligned that when conductor 34 together with movable contacts 29 and 30, pass therethrough upon truck 27 being moved into the truck compartment conductor 34 becomes the primary conductor of the current transformers 72. As shown in the drawings, coils 73 are covered with a metallic barrier 74 which is bolted to upright surface 11. However, the metallic barrier 74 may be easily removed for access to the coils 73 of transformers 72.

These current transformers may be, for example, of the toroidal or window type of high quality core steel which is spirally wound with compensated fully distributed secondary windings. Transformers 72 may be mounted on either the bus, load, or bus and load sides of the switchboard depending on the requirements of the particular application. By mounting the shutter 41 for operation between the coils 73 and the upright surface 11 it is possible to test them without removing them from the enclosed switchboard structure while maintaining maximum operator safety since removal of the circuit breaker on truck 27 automatically removes the primary conductors of transformers 72 and closes off the high voltage bus compartment from the truck compartment.

Figure 6:
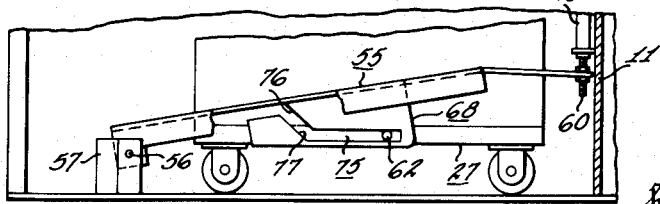
FIG. 6 is a partial cross sectional view of a modification of shutter actuating means illustrated in the structure shown in FIG. 5.

FIG. 6 illustrates a modification of the shutter actuating means illustrated in the structure shown in FIGS. 1–5 wherein lever 55 is provided with a cam surface element 68 fixedly attached thereto to extend substantially longitudinally thereof. Element 68 is slotted at 75 to provide a dual or double acting cam track which is effective during both opening and closing operation of the shutter mechanism. Roller 62 is journaled on a shaft mounted on truck 27 and engages with the top surface 76 of slot 75 during the movement of truck 27 into the truck compartment and engages with the lower surface 77 of slot 75 during the movement of truck 27 out of the truck compartment.

A complete cycle of operation of the shutter structure is as follows:

The shutter blades 42 and 43 are in shutter closed position as the truck 27 is rolled into the truck compartment 12 of the enclosed switchboard structure. Part way in the truck compartment roller 62 engages cam follower 63 of FIGS. 1–5 or cam surface element 68 of FIG. 6 and it is forced to ride along the track in follower 63 or element 68. This action elevates shutter lift lever 55 which pivots about pivot 56. Counterclockwise rotation of lever 55 lifts rod 45 vertically. Although lever 55 moves in an arc whose center is at pivot 56 the loose joining of lever 55 to rod 45 results in vertical straight line travel of rod 45. As rod 45 is raised up rod 48 loosely connected thereto pivots counterclockwise about pin 49 and results in a downward movement of rod 44. As rod 45 and shutter blade 42 moves upward rod 44 and shutter blade 43 moves downward. This positive and substantially simultaneous action results in blades 42 and 43 exposing apertures 38 and 39 and being locked in that position by the frame of truck 27.

As truck 27 is withdrawn from the truck compartment the above action is reversed. Roller 62 rides along the track in cam follower element 63 or in the slot of cam surface element 68. This causes clockwise rotation of lever 55 and the raising of rod 44 and shutter blade 43 and the lowering of rod 45 and shutter blade 42 to close apertures 39 and 38, respectively.

The shutter blades are moved to closed position during the short travel of roller 62 along cam follower element 63. This means that the shutter is locked closed whenever the circuit breaker on truck 27 is in the disconnected position. Movement of shutter 41 does not depend on gravity, particularly the closing operation but is completely a positive action resulting from the cooperation of parts of the truck and switchboard structure.

Although but two embodiments of the present invention have been illustrated and described it will be apparent to those skilled in the art that various changes and modifications may be made therein without departing from the spirit of the invention or from the scope of the appended claims.

Having now particularly described and ascertained the nature of my said invention and the manner in which it is to be performed, I declare that what I claim is:

1. An enclosed switchboard having two communicating compartments, a shutter mechanism controlling communication between said compartments and movable between open and closed positions, said mechanism comprising a pair of spaced vertically arranged rods mounted to reciprocate axially, a pair of shutter blades, said blades being arranged to extend between said rods in substantially the same plane with each of said blades being fixedly attached to a different one of said rods, means for actuating said rods in unison in opposite directions in a counterbalancing arrangement to move said blades in their planes, said means comprising a lever pivotally mounted intermediate its ends and loosely connected in a lost motion connection at each end thereof to one of said rods, and means for rotating said lever in two directions to reciprocally move said rods and said blades.

2. An enclosed switchboard having two communicating compartments, a shutter mechanism controlling communication between said compartments and movable between open and closed positions, said mechanism comprising a pair of spaced vertically arranged rods mounted to reciprocate axially in a vertical direction, a pair of shutter blades, said blades being arranged to extend between said rods in a common plane with each of said blades being fixedly attached to a different one of said rods, means for actuating said rods in unison to move said blades in said common plane in opposite directions, said means comprising a lever pivotally mounted intermediate its ends and being loosely connected at each end theref in a lost motion connection to one of said rods, and means for actuating said lever to reciprocally move said rods and said blades.

3. An enclosed switchboard having two communicating compartments, a shutter mechanism controlling communication between said compartments and movable between open and closed positions, said mechanism comprising a pair of spaced vertically arranged reciprocally mounted rods, a pair of shutter blades, said blades being arranged to extend between said rods in substantially the same plane with each of said blades being fixedly attached to a different one of said rods, means for actuating said rods in unison in opposite directions to reciprocate said blades in their planes, said means comprising a first lever pivotally mounted between the ends thereof and loosely connected at each end to a different one of said rods, and means for actuating said lever to reciprocally move said rods and said blades, said actuating means comprising a second pivotally mounted lever loosely connected at one end thereof to one of said rods and rotated by a carrier movable into one of said compartments.

4. An enclosed switchboard having two communicating compartments, a shutter mechanism mounted within one of said compartments and controlling communication between said compartments, said mechanism being movable between open and closed positions and comprising a pair of spaced vertically arranged reciprocally mounted rods, a pair of shutter blades, said blades being arranged to extend between said rods in substantially the same plane with each of said blades being fixedly attached to a different one of said rods, means for reciprocally actuating said rods in unison in opposite directions to reciprocate said blades in their planes in a counterbalancing arrangement, said means comprising a first lever arranged within said one of said compartments, said first lever being pivotally mounted intermediate its ends and loosely connected at each end thereof to a different one of said rods, means for actuating said first lever to reciprocally move said rods and said blades, said actuating means comprising a second lever pivotally mounted at one end thereof within said one of said compartments and connected at the other end to one of said rods, a double acting cam surface element and a cam follower element, one of said elements being mounted on said second lever, and a carrier movable into said one of said compartments, said other of said elements being mounted on said carrier, said carrier upon movement into said one of said compartments causing said elements to engage to actuate said first lever, said rods and said blades.

5. An enclosed switchboard having two communicating compartments, a shutter mechanism mounted within one of said compartments and controlling communication between said compartments, said mechanism being movable between open and closed positions and comprising a pair of spaced vertically arranged reciprocally mounted rods, a pair of shutter blades, said blades being arranged to extend between said rods in a common plane with each of said blades being fixedly attached to a different one of said rods, means for reciprocally actuating said rods in unison in opposite directions to reciprocate said blades in said common plane in a counterbalancing arrangement, said means comprising a first lever arranged within said one of said compartments, said first lever being pivotally mounted intermediate its end and loosely connected at each end thereof to a different one of said rods, means for actuating said first lever to reciprocally move said rods and said blades, said actuating means comprising a second lever pivotally mounted at one end thereof within said one of said compartments and connected at the other end to one of said rods, a cam element comprising a slotted member having two cam operating surfaces and a cam follower element, said cam follower element being mounted on said second lever, and a carrier movable into said one of said compartments, said cam element being mounted on said carrier, said carrier upon movement into said one of said compartments causing said cam follower element to engage one of said surfaces of said cam element to actuate said first lever, said rods and said blades to shutter open position and upon movement out of said one of said compartments causing said cam follower element to engage the other of said surfaces of said cam element to actuate said first lever, said rods and said blades to shutter closed position.

(References on following page)

References Cited in the file of this patent

UNITED STATES PATENTS

| | | |
|---|---|---|
| 1,699,753 | Rawling | Jan. 22, 1929 |
| 1,729,864 | Brown | Oct. 1, 1929 |
| 1,810,694 | Brown | June 16, 1931 |
| 1,866,364 | Macneil | July 5, 1932 |
| 1,935,448 | Huber | Nov. 14, 1933 |
| 2,563,441 | Wood | Aug. 7, 1951 |
| 2,673,260 | Lester | Mar. 23, 1954 |

FOREIGN PATENTS

| | | |
|---|---|---|
| 438,225 | Great Britain | Nov. 13, 1935 |